US008443178B2

(12) United States Patent  (10) Patent No.: US 8,443,178 B2
Kohiga  (45) Date of Patent: May 14, 2013

(54) OPERATING SYSTEM IMAGE SHRINKING APPARATUS AND METHOD AND COMPUTER READABLE TANGIBLE MEDIUM STORING A PROGRAM FOR OPERATING SYSTEM IMAGE SHRINKING

(75) Inventor: Akihito Kohiga, Minato-ku (JP)

(73) Assignee: NEC Corporation, Tokyo (JP)

( * ) Notice: Subject to any disclaimer, the term of this patent is extended or adjusted under 35 U.S.C. 154(b) by 779 days.

(21) Appl. No.: 12/388,041

(22) Filed: Feb. 18, 2009

(65) Prior Publication Data

US 2009/0210688 A1   Aug. 20, 2009

(30) Foreign Application Priority Data

Feb. 20, 2008   (JP) .................................. 2008-038545

(51) Int. Cl.
*G06F 9/00*   (2006.01)
(52) U.S. Cl.
USPC ................................... 713/1; 713/2; 713/100
(58) Field of Classification Search .................. 713/1, 2, 713/100
See application file for complete search history.

(56) References Cited

U.S. PATENT DOCUMENTS

| 5,481,708 A * | 1/1996 | Kukol ............................ 717/155 |
| 6,119,186 A * | 9/2000 | Watts et al. .................... 710/104 |
| 7,624,390 B2 * | 11/2009 | Asao ............................. 717/159 |
| 2004/0045011 A1 * | 3/2004 | Chou ............................. 719/320 |
| 2006/0123198 A1 * | 6/2006 | Asao ............................. 711/137 |
| 2009/0307676 A1 * | 12/2009 | Price et al. .................... 717/162 |

FOREIGN PATENT DOCUMENTS

| JP | 8314699 A | 11/1996 |
| WO | 2007037846 A1 | 4/2007 |

OTHER PUBLICATIONS

Communication dated Jul. 3, 2012 from the Japanese Patent Office in counterpart Japanese application No. 2008-038545.
Nakamoto et al., "C/C++ Programming Environment MKSPACE", NEC Technical Report, NEC Creative Ltd., pp. 30-35, vol. 47, No. 6, Jul. 15, 1994.
Lane, "The optimization compiler of the superscalar age", Nikkei Byte, Nikkei Business Publications Inc., pp. 263-271, vol. 124, Apr. 1, 1994.
Moriwaka et al., "Size Reduction of Multi-purpose Operating Systems for Application-specific", IPS technical report, pp. 1-7, vol. 2001, No. 65 (2001-OS-87), Jun. 29, 2001.

* cited by examiner

*Primary Examiner* — M Elamin
(74) *Attorney, Agent, or Firm* — Sughrue Mion, PLLC

(57) ABSTRACT

An OS image shrinking apparatus for shrinking a size of at least one OS image stored in a computer. The OS image shrinking apparatus includes an execution history management unit that operates a predetermined application program on the computer for a predetermined time and manages an execution history of a function by monitoring the function executed during operation of the application program, a saved function management unit that refers to the execution history managed by the execution history management unit and manages the function existing in the execution history, as a saved function, among functions included in the OS image, and an unused function processing unit that performs a processing to delete from the OS image a function not managed by the saved function management unit, as an unused function, among the functions included in the OS image.

15 Claims, 9 Drawing Sheets

Fig. 3

APPLICATION EXECUTION HISTORY 415

| APPLICATION NAME | EXECUTION STARTING TIME | EXECUTION END TIME |
|---|---|---|
| APPLICATION A (FOR EXAMPLE, WEB SERVER) | 00:00:00:00 | 00:00:00:10 |

Fig. 4

FUNCTION EXECUTION HISTORY 416

| THREAD NAME | EXECUTED FUNCTION | EXECUTION REQUESTER | EXECUTION START TIME | DATA ADDRESS |
|---|---|---|---|---|
| SYSTEM CALL A (FOR EXAMPLE, malloc) | SYSTEM CALL A (malloc) | APPLICATION (FOR EXAMPLE, WEB SERVER) | 00:00:00:00 | 0x123-0x234 |
| | FREE MEMORY SEEKING FUNCTION | | | 0x235-0x345 |
| | MEMORY ALLOCATION FUNCTION | | | 0x346-0x456 |
| SYSTEM CALL B (FOR EXAMPLE, read) | SYSTEM CALL A (read) | APPLICATION (FOR EXAMPLE, WEB SERVER) | 00:00:00:01 | 0x567-0x789 |
| | FREE MEMORY SEEKING FUNCTION | | | |
| | MEMORY ALLOCATION FUNCTION | | | |
| INTERRUPTION PROCESSING | INTERRUPTION PROCESSING FUNCTION | OS (FOR EXAMPLE, LINUX) | 00:00:00:02 | 0x678-0x987 |
| | DATA WRITING FUNCTION | | | |
| TASK MANAGEMENT (schedule) | TASK SELECTION FUNCTION | OS (FOR EXAMPLE, LINUX) | 00:00:00:03 | 0xaaa-0xbbb |
| | TASK SELECTION FUNCTION | | | |

UNUSED FUNCTION LIST

| FUNCTION NAME | START ADDRESS | END ADDRESS |
| --- | --- | --- |
| A | 1 | 10 |
| C | 22 | 45 |
| D | 69 | 72 |

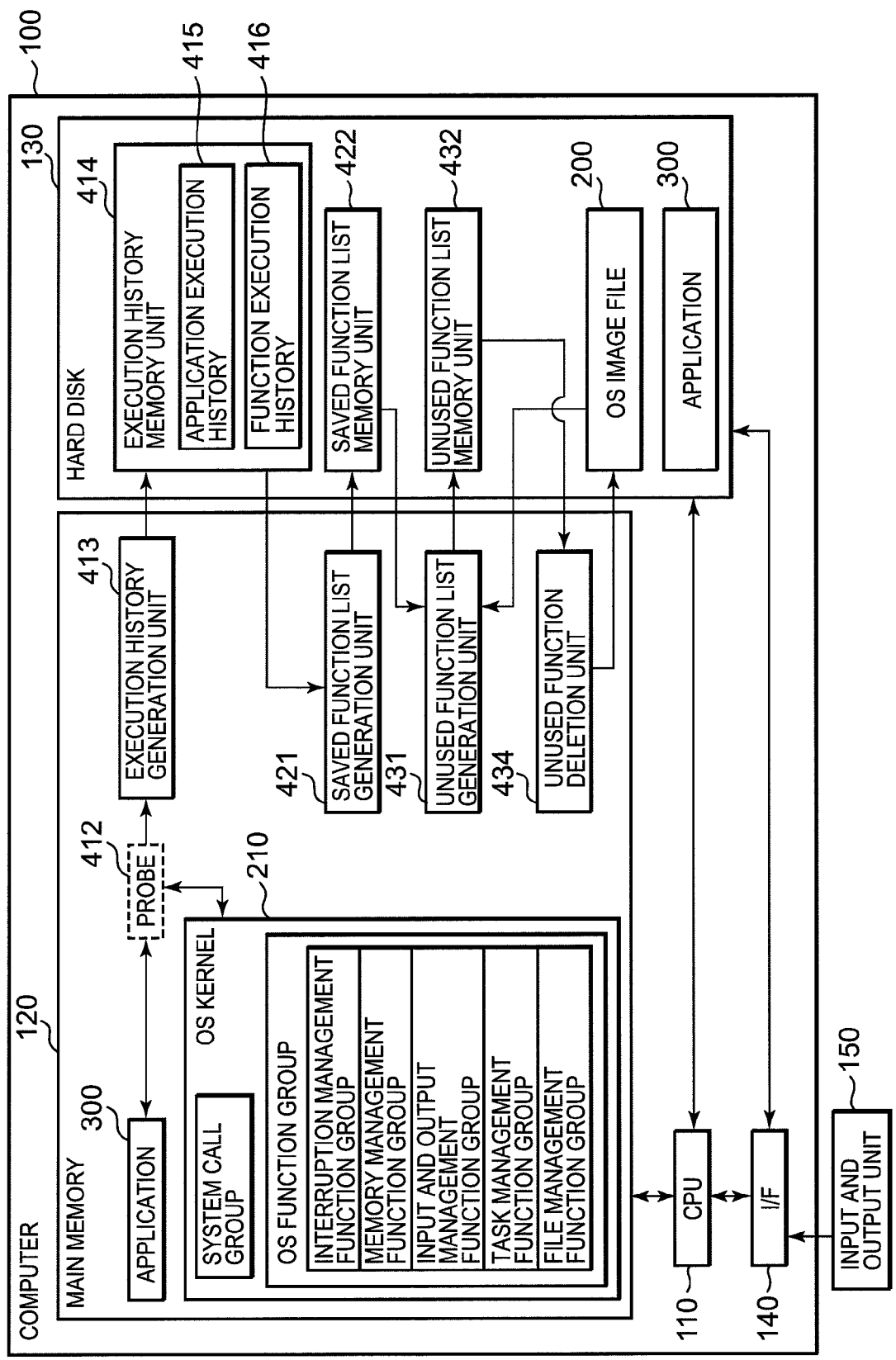

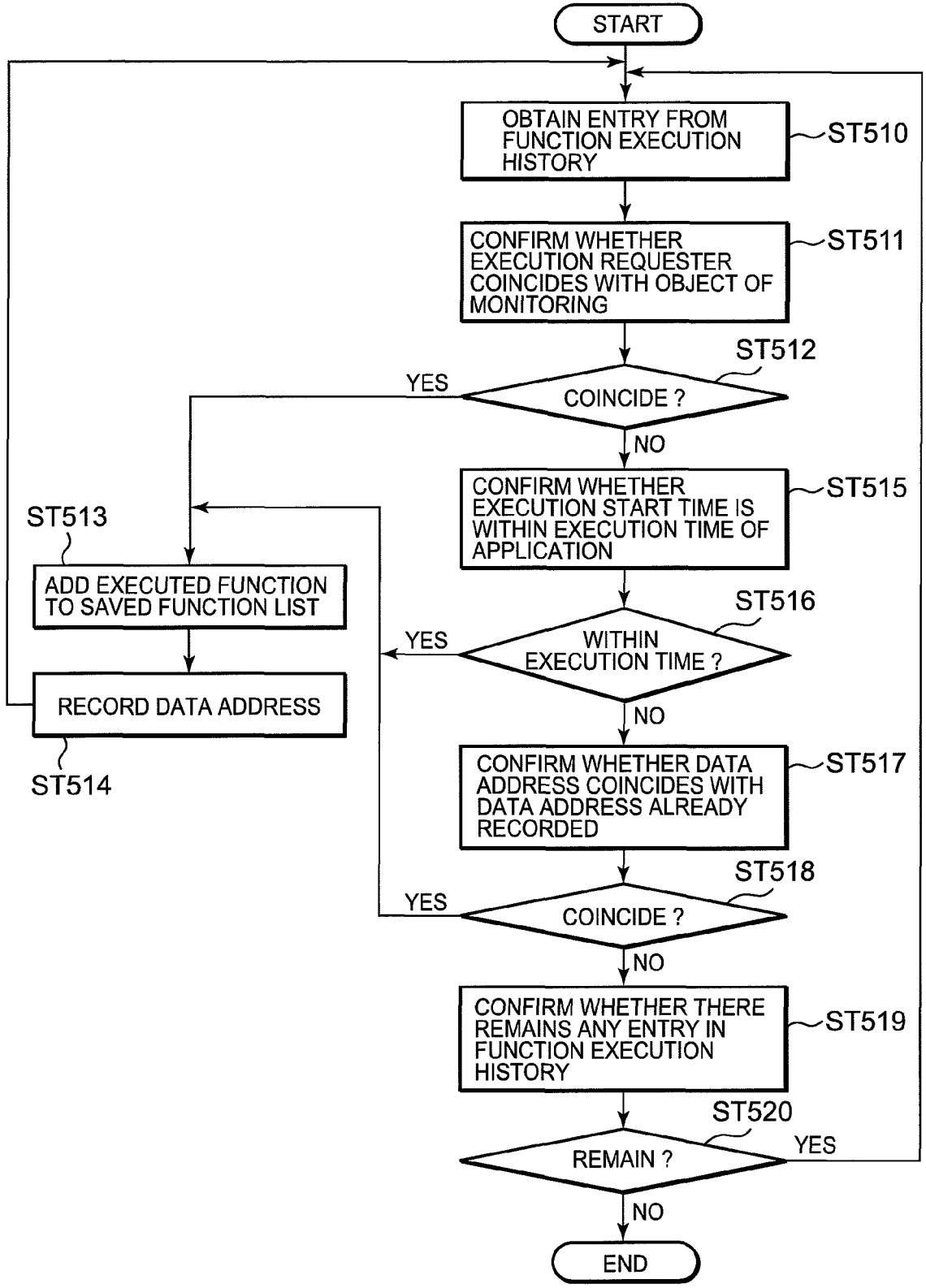

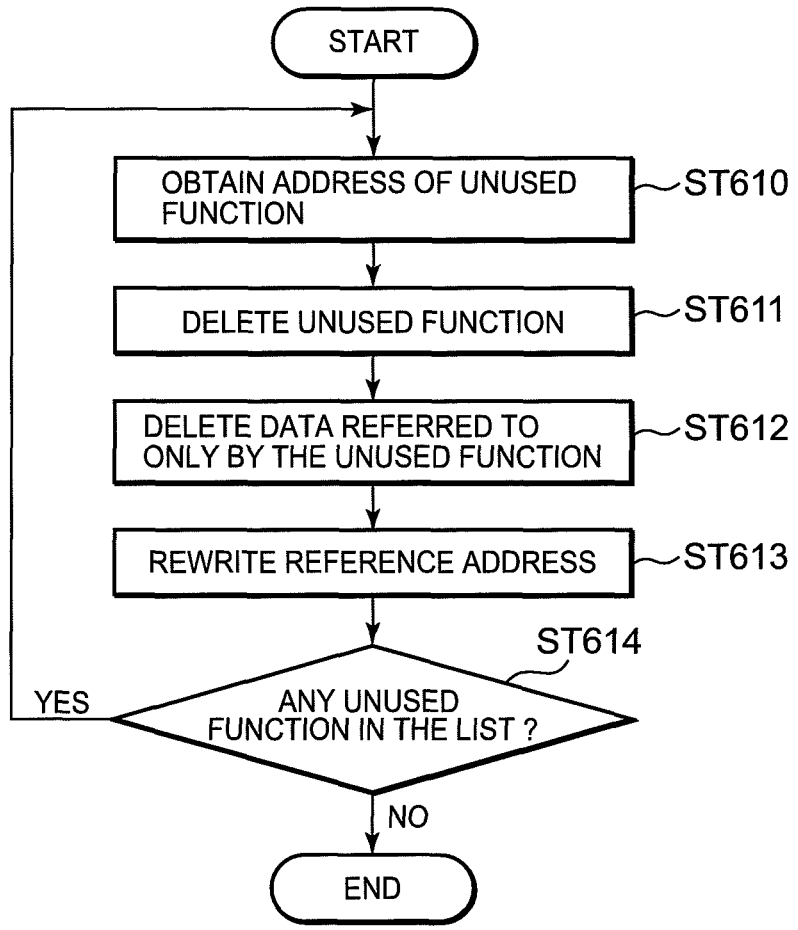

OPERATING SYSTEM IMAGE SHRINKING APPARATUS AND METHOD AND COMPUTER READABLE TANGIBLE MEDIUM STORING A PROGRAM FOR OPERATING SYSTEM IMAGE SHRINKING

CROSS-REFERENCE TO RELATED APPLICATION

This application is based upon and claims priority from Japanese Patent Application No. 2008-038545, filed on Feb. 20, 2008 in the Japanese Patent Office, the disclosure of which is incorporated by reference herein in its entirety.

BACKGROUND

1. Technical Field

Aspects of the present invention relate to an Operating System (OS) image shrinking method, an OS image shrinking program, and a recording medium having an OS image shrinking program recorded thereon.

2. Description of the Related Art

An Operating System (OS) is necessary to start and execute an application program on a computer. The OS is a system widely used as basic software for providing basic functions such as an input and output function, a memory management function, and the like, commonly utilized by many pieces of application software and for providing application software with abstract interfaces representing hardware. A full set of Operating System files (OS files) with multiple functions are configured to give versatility to hardware and applications used by a user. Especially, recently, as computer functions make progress, there arises a demand for highly extensible Graphical User Interface (GUI) functions and high level and complicated management functions. Thus, functions required in the OS have increased to cause the size of the OS files to become quite large. Generally, the OS files are saved and used in a main memory (a main memory apparatus) or a hard disk (an auxiliary memory apparatus) included in the computer, and as the size of the OS becomes larger, a capacity required in the computer is becoming extremely large.

Japanese Patent Laid-Open No. H10-143356 (hereinafter "patent document 1") and Japanese Patent Laid-Open No. H7-44397 (hereinafter "patent document 2") suggest structures to shrink the size of the OS files stored and saved in the computer at all times (for example, page 14 and FIG. 11 of Patent Document 1 and page 4 and FIG. 1 of Patent Document 2).

Patent Document 1 discloses an information processing system. This information processing system employs a structure to save in the computer some of the OS files, among the multiple OS files constituting a full set of the OS, and record the other OS files in an external recording medium. For example, a kernel, a device manager (e.g., keyboard processing, display processing, mouse processing, IDE/network processing), a file manager, a memory manager, and a task manger, as an OS file group not affected by a system environment, are saved in the computer. On the other hand, a GUI manager, a kana-kanji conversion manager, a printer manager, font files, library files, and the like, as an OS file group basically not affected by the system environment, are recorded not in the computer, but in the recording medium.

When an application is executed, a determination is made as to whether the computer has all the OS files needed for operation of the application, and if the needed files are not saved in a computer side, then the needed files are loaded from the recording medium to the computer. For example, a printer manger is loaded if the application needs a printer.

According to this structure, the computer side holds only the minimum necessary OS files. Thus, the size of the OS can be made smaller in the computer.

Patent Document 2 discloses a program-processing speed-enhancement method.

In this program-processing speed-enhancement method, a measuring unit that measures the number of usages is embedded into a source program, so that the source program embedded with the measuring unit is generated. Then, the source program embedded with the measuring unit is compiled to generate an executable program. The executable program is provided with specific data and is caused to be executed, and the program measures whether or not each of the branching commands in the program has been executed and collects measurement values. The branching commands not having been executed are deleted, so that the source program from which the unnecessary branching commands have been deleted is obtained. With the method as described above, a source program optimized for the specific data is obtained.

That is, a universal program is customized to suit a specific user and a purpose of utilization, thus being able to enhance the speed of processing, and at the same time, being able to shrink the program by deleting unnecessary portions (the branching commands).

However, there exist problems that, among other things, the structure in Patent Document 1 hardly contributes to shrinking the size of the OS and actually places the same burden on the capacity of the computer as conventional structures.

For example, Patent Document 1 recites that library files are recorded in the recording medium and are loaded to the computer side, if necessary, during execution of the application. It is presumed that Patent Document 1 employs a structure wherein the library files are recorded in the recording medium because one application seldom uses all the features and functions included in the library files, but that the library files themselves are generally used by all applications, although their usage amounts vary. Accordingly, during execution of an application, it is almost always necessary to load the library files to the computer side. The same situation is also applicable to the other files, namely, the GUI manager, the kana-kanji conversion manager, the printer manager, and the font files.

Thus, after all, with the structure of Patent Document 1 that makes a determination as to whether or not reading-out is required in units of files, it is necessary to read the entire OS files, including unnecessary portions, from the recording medium into the computer side.

The device manager, the file manager, and the memory manager saved in the computer occupy a large portion of a computer memory at all times although one application does not need all of these functions.

Thus, during execution of an application, it is necessary to save all the OS files including the unnecessary portions in the computer, and in reality, performance required in the capacity of the computer stays the same.

On the other hand, there exists a problem in that, among other things, a structure of Patent Document 2 cannot be applied to the OS.

In Patent Document 2, specific data are given to a program (for example, the OS) and a determination is made as to whether branching commands in the program (for example, the OS) are required or not. But, in the OS, there exist many portions, such as an interruption processing, that are difficult to be determined by giving the specific data.

As a result, in a case where the structure of Patent Document 2 is employed in the OS, there exists an extremely high risk of deleting essentially necessary portions.

In addition, task scheduling and memory management functions do not rely on specific data, and it is highly possible that these functions would be deleted.

Because of the problems described above, and other problems not specifically described above, a structure is earnestly needed that reduces the burden placed on the capacity of the computer by appropriately shrinking the size of the OS.

SUMMARY

Embodiments of the present invention overcome the above disadvantages and also overcome other disadvantages not described above. Indeed, the present invention is not required to overcome the disadvantages described above and certain embodiments of the present invention may not overcome any of the problems described above.

An aspect of certain embodiments of the present invention is to provide an OS image shrinking method, an OS image shrinking program, and a recording medium having the OS image shrinking program recorded thereon for appropriately shrinking the size of an OS.

Another aspect of certain embodiments of the present invention concerns an operating system (OS) image shrinking apparatus. The OS image shrinking apparatus includes an execution history management unit configured to operate an application program on a computer, monitor a first function executed during operation of the application program, and manage an execution history, wherein the execution history comprises data regarding execution of the first function, a saved function management unit configured to refer to the execution history and manage the first function as a saved function among functions included in an OS image stored in the computer, and an unused function processing unit configured to determine a second function, which is not managed by the saved function management unit, as an unused function, among the functions included in the OS image, and configured to delete the second function from the OS image.

Yet another aspect of certain embodiments of the present invention concerns an operating system (OS) image shrinking method. The OS image shrinking method includes an execution history management operation including operating an application program on a computer, monitoring a first function executed during operation of the application program, and managing an execution history, wherein the execution history comprises data regarding execution of the first function, a saved function management operation including referring to the execution history, and managing the first function, as a saved function, among functions included in an OS image stored in the computer, and an unused function processing operation including determining a second function, which is not managed by the saved function management operation, as an unused function, among the functions included in the OS image, and deleting the second function from the OS image.

Still another aspect of certain embodiments of the present invention concerns a computer readable tangible medium storing a program including instructions for enabling a computer to execute processes. The processes includes an execution history management process including operating an application program on a computer, monitoring a first function executed during operation of the application program, managing an execution history, wherein the execution history comprises data regarding execution of the first function, a saved function management process including referring to the execution history, and managing the first function, as a saved function, among functions included in an OS image stored in the computer; and an unused function processing process including determining a second function, which is not managed by the saved function management process, as an unused function, among the functions included in the OS image, and deleting the second function from the OS image.

According to certain embodiments of the present invention, unnecessary portions can be deleted from the OS image in units of functions, and thus, the OS image can be effectively shrunk.

BRIEF DESCRIPTION OF THE DRAWINGS

Aspects of embodiments of the present invention will become more apparent by describing in detail embodiments thereof with reference to the accompanying drawings, in which:

FIG. 3 is a diagram showing a table of an application execution history.

FIG. 4 is a diagram showing a table of a function execution history.

FIG. 5 is a diagram showing a configuration example of an unused function list.

FIG. 7 is a diagram showing a state that needed files are loaded to a main memory.

FIG. 8 is a flowchart showing an example of a procedure of a saved function list generation operation.

FIG. 9 is a flowchart showing a procedure of an unused function deletion operation.

DETAILED DESCRIPTION OF EMBODIMENTS

Embodiments of the present invention will be described with reference to the drawings.

Figure 1:
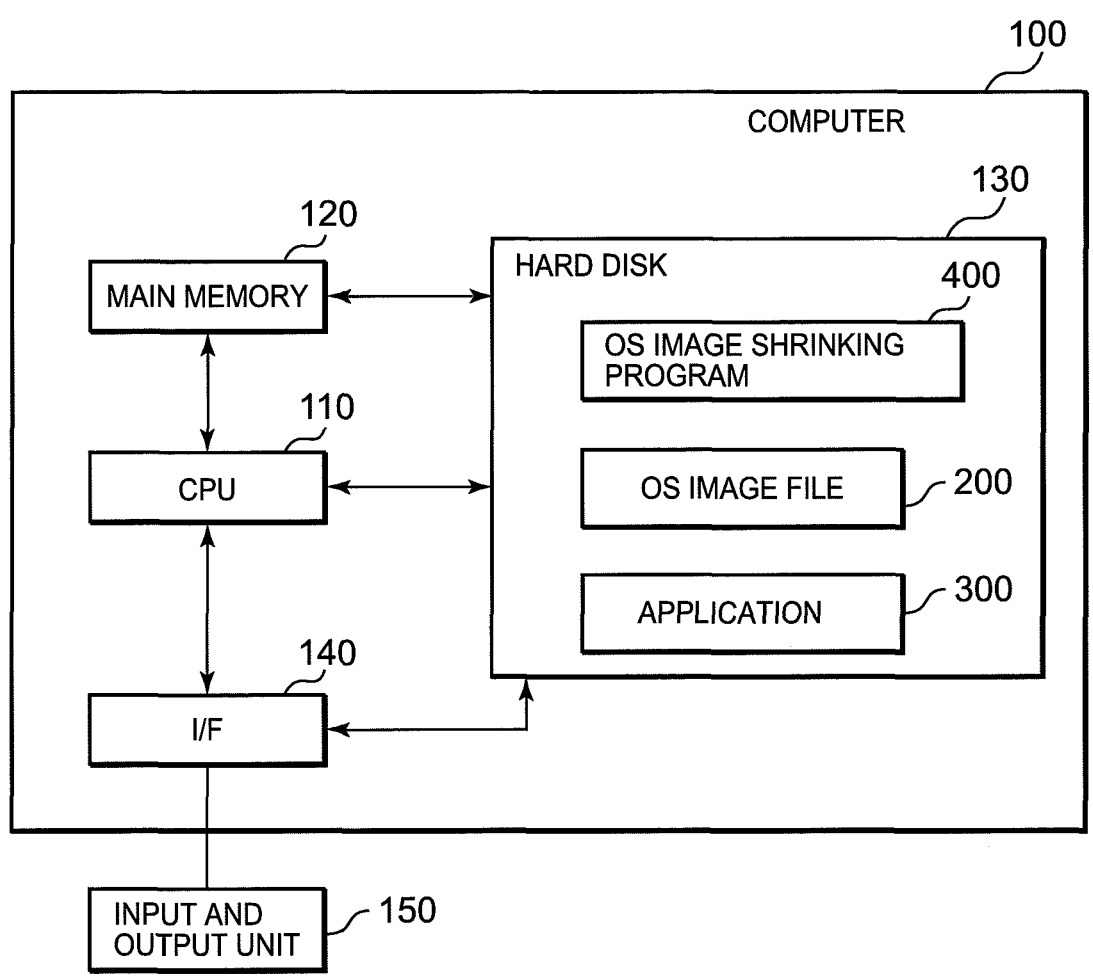
FIG. 1 is a diagram showing a structure of a computer that executes an OS image shrinking program.

FIG. 1 is a diagram showing a structure of a computer 100 for executing an OS image shrinking program 400 according to a first embodiment of the present invention.

The computer 100 has a central processing unit (CPU) 110, a main memory 120, a hard disk 130, and an interface (I/F) 140.

An input and output unit 150 is connected to the computer 100 via the interface 140.

The input and output unit 150 includes, for example, a keyboard, a mouse, a printer, a monitor, a modem, and the like, but is not limited to these examples.

A hard disk 130 stores and saves necessary programs. In the first embodiment, the hard disk 130 saves an object of shrinking, i.e., an OS image file 200, a specific application 300, and the OS image shrinking program 400.

Herein, Linux® can be mentioned as an example of the OS image file 200, and a Web server can be mentioned as an example of the application 300. However, the types of the OS and the application are not limited to these examples.

Next, a structure of the OS image shrinking program 400 according to the first embodiment will be described.

Figure 2:
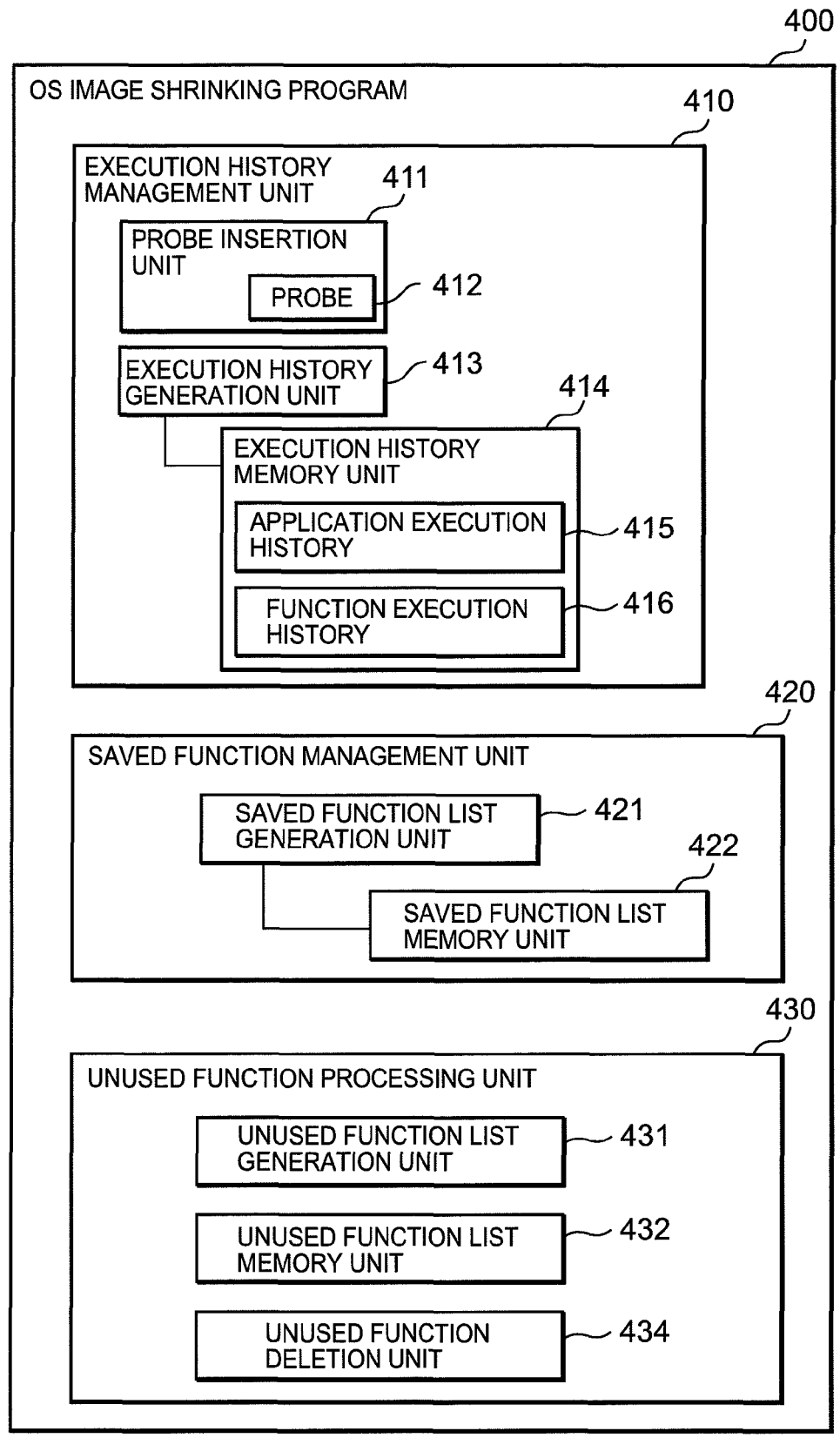
FIG. 2 is a diagram showing a structure of the OS image shrinking program.

FIG. 2 is a diagram showing the structure of the OS image shrinking program 400.

The OS image shrinking program 400 has an execution history management unit 410, a saved function management unit 420, and an unused function processing unit 430.

The execution history management unit 410 manages an execution history by monitoring functions executed during operation of a program.

The saved function management unit 420 manages execution functions, as saved functions, among the functions in the OS image by referring to the execution history managed by the execution history management unit 410.

The unused function processing unit 430 performs a processing to delete functions not managed by the saved function management unit 420, as unused functions, among the functions in the OS image.

The execution history management unit 410 has a probe insertion unit 411 that embeds a probe 412 for measuring operation into the OS image and the application 300, an execution history generation unit 413 that generates the execution history from information obtained by the probe 412, and an execution history memory unit 414 that stores the generated execution history.

The probe 412 interrupts an execution of an arbitrary command in an OS kernel 210 (shown in FIG. 7) to obtain execution information of the command.

For example, Kprobe® can be used as an example of the probe 412, but the present invention is not limited to the aforementioned example.

The probe insertion unit 411 embeds this probe 412 into the OS image and the application 300.

The execution history generation unit 413 generates the execution history of the application 300 and each function, based on information obtained with the probe 412.

As shown in FIG. 3, the application execution history 415 of the application 300 is generated, for example, as a table recorded with the names of the operating applications, start times of their execution, and end times of their executions.

As shown in FIG. 4, a function execution history 416 is generated, for example, as a table showing information of executed functions.

The function execution history 416 is recorded with the names of threads, executed function groups, requesters of the executions, start times of the executions, and data addresses.

The application execution history table 415 and the function execution history 416 thus generated are stored in the execution history memory unit 414.

The saved function management unit 420 has a saved function list generation unit 421 that generates a saved function list by selecting the execution functions recorded as the saved functions in the function execution history 416 and also has a saved function list memory unit 422 that stores the generated saved function list.

The saved function list generation unit 421 makes the saved function list by picking up OS function groups executed in connection with operation of the application 300 from the function execution history 416, and stores the thus generated saved function list in the saved function list memory unit 422.

The unused function processing unit 430 has an unused function list generation unit 431, an unused function list memory unit 432, and an unused function deletion unit 434.

The unused function list generation unit 431 generates an unused function list 433 (as shown in FIG. 5) by selecting functions not entered into the saved function list, as unused functions, among the functions in the OS image.

The unused function list memory unit 432 stores the generated unused function list 433.

The unused function deletion unit 434 deletes the functions existing in the unused function list 433 from the OS image file 200.

The unused function list generation unit 431 refers to the saved function list and the OS image file 200, and generates a list by selecting functions included in the functions of the OS image file 200 but not listed in the saved function list.

The functions thus selected and their corresponding addresses are made into a table and as a list.

FIG. 5 is a diagram showing a configuration example of the unused function list 433. The unused function list 433 is recorded with the names of the functions, start addresses, and end addresses.

The unused function deletion unit 434 obtains an address of the unused function existing in the unused function list 433, and deletes the corresponding function from the OS image file 200. In addition, in a case where there exists data (variables) referred to only by the deleted function, the data (the variables) are deleted. Then, a value equivalent to the size of the deleted function is subtracted from addresses referred to by remaining functions.

Thus, the OS image file 200 from which the unused redundant functions have been deleted, and whose size has been shrunk, is obtained.

Next, operation of the OS image shrinking program 400 will be described as a second embodiment of the present invention.

Figure 6:
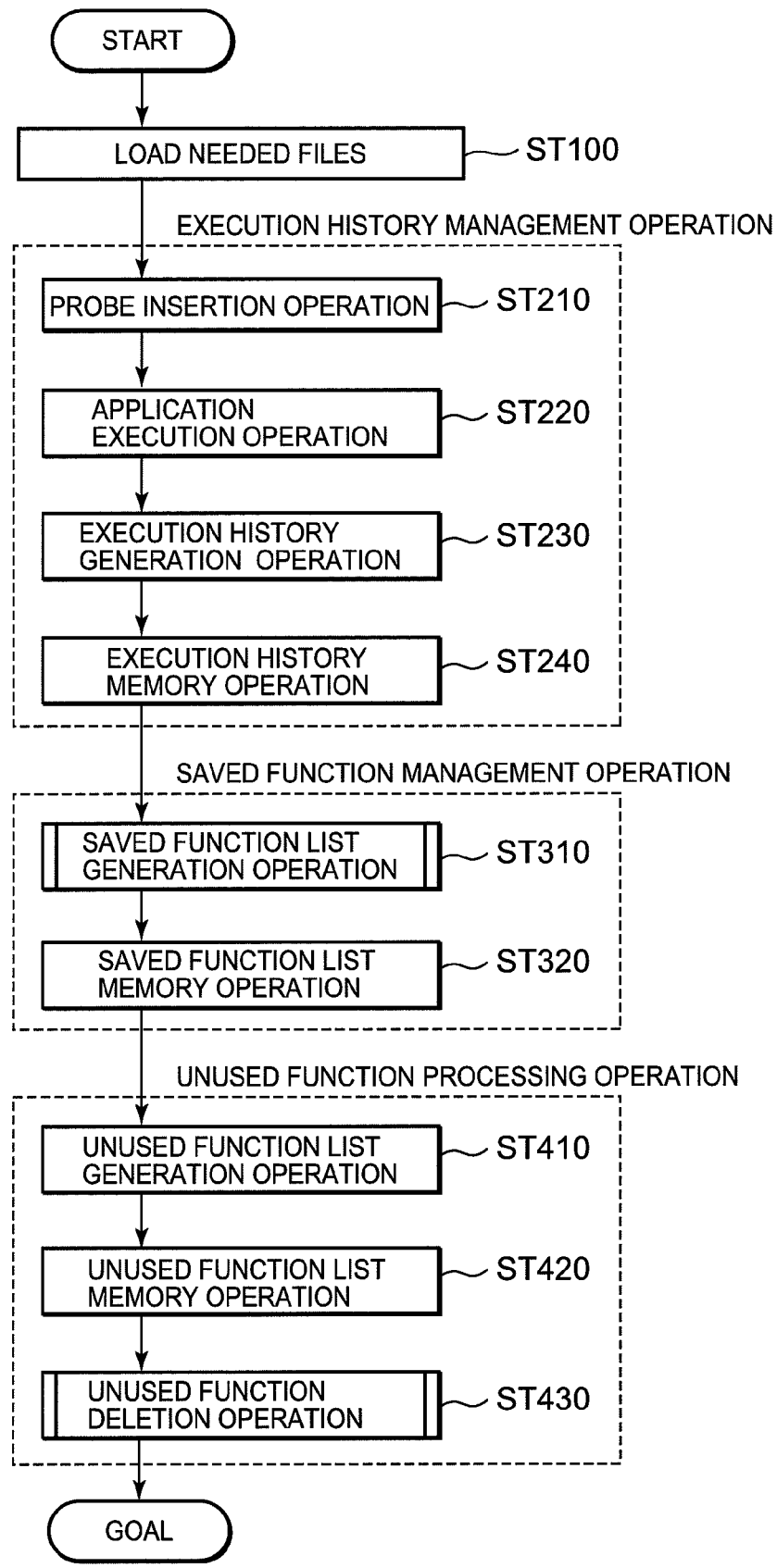
FIG. 6 is a flowchart showing an operation procedure of the OS image shrinking program.

FIG. 6 is a flowchart showing an operation procedure of the OS image shrinking program 400 according to the second embodiment.

To execute the OS image shrinking program 400, files needed for execution of the OS image shrinking program 400 are loaded from the hard disk 130 to the main memory 120 in ST100.

Then, in ST210, the probe insertion unit 411 inserts the probe 412 into the application 300 and the OS kernel 210.

FIG. 7 is a diagram showing a state wherein the needed files in the hard disk 130 are loaded to the main memory 120.

As shown in FIG. 7, the application 300 (for example, a WEB server) and the OS kernel 210 are loaded to the main memory 120, and furthermore, the probe 412 has been embedded into the application 300 and the OS kernel 210 by the probe insertion unit 411 (it should be noted that in FIG. 7, the probe 412 is specifically shown for the purpose of description).

Then, the execution history generation unit 413, the saved function list generation unit 421, the unused function list generation unit 431, and the unused function deletion unit 434 are loaded to the main memory 120.

Upon completion of loading of the needed files, as described above, the application 300 is executed for a predetermined time by an application execution operation of ST220.

During the execution of the application 300, the execution histories of the application 300 and the functions are generated (an execution history generation operation, ST230).

Thus, the execution history of the application 300 and the execution history of the functions, as shown in FIG. 3 and FIG. 4, are generated.

The execution histories thus generated are stored in the execution history memory unit 414 in an execution history memory operation (ST240).

Herein, ST210 to ST240 constitute an execution history management operation.

When the execution histories are generated, a list of the saved functions is generated by referring to the execution histories (a saved function list generation operation, ST310).

The saved function list is made by recording the functions recorded in the function execution history 416 and their corresponding addresses in the saved function list.

FIG. 8 shows an example of a procedure of the saved function list generation operation (ST310).

To generate the saved function list, an entry is first obtained from the function execution history 416 (ST510). Next, it is confirmed whether a requester requesting to execute the entry coincides with the application 300 to be monitored (ST511). If the requester coincides with the to-be-monitored application 300 (YES in ST511), then the execution function of the entry is added to the saved function list (ST513) and a data address of the entry is recorded (ST514). If the requester does not coincide with the to-be-monitored application 300 (NO in ST512), then it is subsequently confirmed whether the start time of an execution of the entry is within an execution time of the to-be-monitored application 300 (ST515).

In this confirmation method, it is confirmed whether the start time of the execution of the entry is on or later than the start time of the execution of the to-be-monitored application 300 and on or before the end time of the execution thereof.

If the start time is within the execution time (YES in ST516), then the execution function of the entry is added to the saved function list (ST513) and the data address of the entry is recorded (ST514).

If the start time is not within the execution time (NO in ST516), then it is confirmed whether the data address coincides with the data address already recorded in ST514 (ST517).

If the data address coincides with the data address already recorded in ST514 (YES in ST518), then the execution function of the entry is added to the saved function list (ST513) and the data address of the entry is temporarily recorded (ST514).

If the data address does not coincide with the data address already recorded in ST514 (NO in ST518), then it is confirmed whether there still remains any entry in the function execution history 416 (ST519).

If there remains any entry (YES in ST520), then operations are repeated from ST510.

If there does not remain any entry (NO in ST520), then the saved function list generation operation is terminated.

The generated saved function list is stored in the saved function list memory unit 422 (a saved function list memory operation, ST320).

Next, an unused function list generation operation is performed in ST410, and the unused function list generation unit 431 generates the unused function list 433.

That is, the saved function list and the OS image file 200 are referred to, and a list is generated as the unused function list 433 by selecting functions included in the functions in the OS image file but not listed in the saved function list.

At this time, the unused function list generation unit 431 obtains and temporarily saves the names of all the functions included in the OS function group of the OS image file 200, the start addresses of these functions, and the end addresses thereof.

Then, the unused function list 433 is generated by referring to the saved function list and by deleting the functions listed in the saved function list from the temporary saved file.

The generated unused function list 433 is stored in the unused function list memory unit 432 (an unused function list memory operation, ST420).

After the unused function list 433 is generated, an unused function deletion operation (ST430) is performed in ST430, and the unused function deletion unit 434 deletes the unused functions from the OS image file 200.

FIG. 9 shows a procedure of the unused function deletion operation (ST430).

To delete the unused functions, an address of the to-be-deleted unused function entered in the unused function list 433 is first obtained (ST610).

At this time, the unused function deletion unit 434 sequentially obtains the functions in descending order of the starting address, as the to-be-deleted functions, from the functions entered into the unused function list 433.

Then, the unused function is deleted from the OS image file 200 (ST611).

Next, data referred to only by the deleted unused function are deleted (ST612).

That is, if there exist any variables accessed only by the unused function, then these variables are deleted.

Next, the size of the unused function deleted earlier is subtracted from reference addresses used by the functions remaining in the OS file (ST613).

Then, ST610 to ST613 are repeated until all the unused functions entered into the unused function list 433 are deleted from the OS image file 200 (ST614).

As described above, the unused functions are deleted from the OS image, and an appropriate shrinking of the OS image is completed.

The embodiments achieve the following effects (and other effects not specifically mentioned below).

The OS executed during operation of the application 300 is monitored and recorded in units of functions in the execution history management operation (ST210-ST240), and the unused functions are deleted from the OS image in units of functions during deletion of the unused functions in an unused function processing operation (ST410-ST430).

Thus, the unused portion of the OS image is deleted, so that the size of the OS image is effectively shrunk.

Conventionally, frequency of usage and importance are classified for each file in the OS, and a file of low frequency of usage and importance is caused to be saved in an external medium, so that the size of the OS maintained in the computer is shrunk. However, when seen in units of files, all the files are used during operation of one application 300, although usage amounts vary, so that all the OS files are loaded to the computer in reality. Thus, hardly any effect is actually achieved for the burden placed on the capacity of the computer.

Regarding this point, in the present embodiment, whether required or not is determined in units of functions, and the unused functions are deleted, so that the size of the OS image can be effectively shrunk.

Further, in the execution history management operation (ST210-ST240), the probes 412 are embedded into not only the to-be-shrunk OS but also the application 300, and the functions used during operation of the application are entered into the function execution history 416.

Thus, the functions needed for operation of the application are reliably saved, so that disadvantages such as careless deletion can be obviated.

Conventionally, an execution history of a program is obtained by running specific data with the probes being embedded only into the to-be-shrunk program. However, it is impossible to correctly determine a needed portion of the OS performing a wide range of processing by merely seeing the execution history when specific data is given in this way.

Regarding this point, in the present embodiment, the operation of the application 300 and the operation of the OS function group are associated with each other. Thus, it is possible to correctly determine needed functions and to reliably save the determined functions as the saved functions.

Moreover, to delete the unused functions, the unused functions are deleted from the OS image by referring to the addresses in the unused function list 433. Thus, binary files on a hard disk can be automatically shrunk without returning back to source programs (source codes) and editing the programs. In addition, the unused functions are deleted in descending order of the address, so that it is possible to minimize rewriting operation of reference addresses as little as possible.

The present invention can be used to (among other things) shrink the size of the OS. In addition, for example, the present invention can contribute to the OS in a computer system optimized for execution of a specific application and an embedded system having a limited physical memory.

While embodiments of the present invention have been described in detail above, it is contemplated that numerous modifications may be made to the above embodiments without departing from the spirit and scope of the present invention which is defined by the following claims.

What is claimed is:

1. An operating system (OS) image shrinking apparatus comprising:
   an execution history management unit configured to operate an application program on a computer, monitor a first function executed during operation of the application program, and manage an execution history, wherein the execution history comprises data regarding execution of the first function;
   a saved function management unit configured to refer to the execution history and manage the first function as a saved function among functions included in an OS image stored in the computer; and
   an unused function processing unit configured to determine a second function, which is not managed by the saved function management unit, as an unused function, among the functions included in the OS image, and configured to delete the second function from the OS image.

2. The OS image shrinking apparatus according to claim 1, wherein the execution history management unit comprises:
   a probe embedding unit configured to embed a probe into both the OS image and the application program;
   an execution history generation unit configured to generate the execution history from information obtained with the probe; and
   an execution history memory unit configured to store the execution history.

3. The OS image shrinking apparatus according to claim 1, wherein the saved function management unit comprises:
   a saved function list generation unit configured to generate a saved function list by selecting the first function from the execution history and adding the first function to the saved function list; and
   a saved function list memory unit configured to store the saved function list.

4. The OS image shrinking apparatus according to claim 1, wherein the unused function processing unit comprises:
   an unused function list generation unit configured to generate an unused function list by selecting the second function from functions included in the OS image and adding the second function to the unused function list;
   an unused function list memory unit configured to store the unused function list; and
   an unused function deletion unit configured to delete the second function from the OS image using the unused function list.

5. The OS image shrinking apparatus according to claim 1, wherein the unused function processing unit is configured to delete data from the OS image if the data is referred to only by the unused function.

6. An operating system (OS) image shrinking method comprising:
   an execution history management operation comprising:
      operating an application program on a computer;
      monitoring a first function executed during operation of the application program; and
      managing an execution history, wherein the execution history comprises data regarding execution of the first function;
   a saved function management operation comprising:
      referring to the execution history; and
      managing the first function, as a saved function, among functions included in an OS image stored in the computer; and
   an unused function processing operation comprising:
      determining a second function, which is not managed by the saved function management operation, as an unused function, among the functions included in the OS image; and
      deleting the second function from the OS image.

7. The OS image shrinking method according to claim 6, wherein the execution history management operation further comprises:
   a probe embedding operation comprising embedding a probe into both the OS image and the application program;
   an execution history generation operation comprising generating the execution history from information obtained with the probe; and
   an execution history memory operation comprising storing the execution history.

8. The OS image shrinking method according to claim 6, wherein the saved function management operation further comprises:
   a saved function list generation operation comprising:
      generating a saved function list by selecting the first function from the execution history; and
      adding the first function to the saved function list; and
   a saved function list memory operation comprising storing the saved function list.

9. The OS image shrinking method according to claim 6, wherein the unused function processing operation further comprises:
   an unused function list generation operation comprising:
      generating an unused function list by selecting the second function from functions included in the OS image; and
      adding the second function to the unused function list;
   an unused function list memory operation comprising storing the unused function list; and
   an unused function deletion operation comprising deleting the second function from the OS image using the unused function list.

10. The OS image shrinking method according to claim 6, wherein the unused function processing operation comprises deleting data from the OS image if the data is referred to only by the unused function.

11. A non-transitory computer readable medium storing a program comprising instructions for enabling a computer to execute processes comprising:
   an execution history management process comprising:
      operating an application program on a computer;
      monitoring a first function executed during operation of the application program; and
      managing an execution history, wherein the execution history comprises data regarding execution of the first function;
   a saved function management process comprising:
      referring to the execution history; and managing the first function, as a saved function, among functions included in an OS image stored in the computer; and an unused function processing process comprising:
determining a second function, which is not managed by the saved function management process, as an unused function, among the functions included in the OS image; and
deleting the second function from the OS image.

12. The non-transitory computer readable medium storing the program according to claim 11, wherein the execution history management process further comprises:
a probe embedding process comprising embedding a probe into both the OS image and the application program;
an execution history generation process comprising generating the execution history from information obtained with the probe; and
an execution history memory process comprising storing the execution history.

13. The non-transitory computer readable medium storing the program according to claim 11, wherein the saved function management process further comprises:
a saved function list generation process comprising:
generating a saved function list by selecting the first function, as a saved function from the execution history; and
adding the first function to the saved function list; and
a saved function list memory process comprising storing the saved function list.

14. The non-transitory computer readable medium storing the program according to claim 11, wherein the unused function processing process further comprises:
an unused function list generation process comprising:
generating an unused function list by selecting the second function from functions included in the OS image; and
adding the second function to the unused function list;
an unused function list memory process comprising storing the unused function list; and
an unused function deletion process comprising deleting the second function from the OS image using the unused function list.

15. The non-transitory computer readable medium storing the program according to claim 11, wherein the unused function processing process comprises deleting data from the OS image if the data is referred to only by the unused function.

* * * * *